US008792874B2

(12) United States Patent
Bluvband et al.

(10) Patent No.: US 8,792,874 B2
(45) Date of Patent: Jul. 29, 2014

(54) SYSTEMS, METHODS, CIRCUITS AND ASSOCIATED SOFTWARE FOR AUGMENTING CONTACT DETAILS STORED ON A COMMUNICATION DEVICE WITH DATA RELATING TO THE CONTACT CONTAINED ON SOCIAL NETWORKING SITES

(71) Applicant: Silent Communication Ltd., Tel Aviv (IL)

(72) Inventors: Max Eitan Bluvband, Gibton (IL); Shahar Hajdu, Givataim (IL)

(73) Assignee: Silent Communication Ltd., Tel Aviv (IL)

( * ) Notice: Subject to any disclaimer, the term of this patent is extended or adjusted under 35 U.S.C. 154(b) by 0 days.

(21) Appl. No.: 13/897,468

(22) Filed: May 20, 2013

(65) Prior Publication Data
US 2013/0252599 A1 Sep. 26, 2013

Related U.S. Application Data

(63) Continuation of application No. 12/777,528, filed on May 11, 2010, now Pat. No. 8,494,490.

(60) Provisional application No. 61/177,122, filed on May 11, 2009, provisional application No. 61/255,113, filed on Oct. 27, 2009.

(51) Int. Cl.
*H04M 3/00* (2006.01)
*H04W 4/16* (2009.01)
*H04L 12/58* (2006.01)
*H04M 3/533* (2006.01)

(52) U.S. Cl.
CPC ............. *H04W 4/16* (2013.01); *H04L 12/5835* (2013.01); *H04L 51/066* (2013.01); *H04M 3/53358* (2013.01); *H04L 51/36* (2013.01); *H04L 12/587* (2013.01)
USPC .......................... 455/418; 455/566; 455/556.1

(58) Field of Classification Search
CPC . H04L 12/5835; H04L 12/589; H04L 51/066; H04L 51/36; H04L 12/587; H04L 12/5895; H04W 4/16; H04W 4/12; H04M 3/53358; H04M 2201/60; H04M 2203/4536
USPC ....................................... 455/418, 566, 556.1
See application file for complete search history.

(56) References Cited

U.S. PATENT DOCUMENTS 3,828,132 A 8/1974 Flanagan et al.
4,389,546 A 6/1983 Glisson et al.
(Continued)

FOREIGN PATENT DOCUMENTS

DE 10052368 5/2002
DE 103 09 579 9/2004
(Continued)

Primary Examiner — Manpreet Matharu
(74) Attorney, Agent, or Firm — Vladimir Sherman; Professional Patent Solutions

(57) ABSTRACT

Disclosed are methods, circuits, systems and applications for providing messaging services which may provide for download, synchronization, voicemail-message to text-message translation, direct access and handling of selected voicemail messages through a user's user interface. Further disclosed are systems, methods, circuits and associated software for retrieving data associated with contacts stored on a communication device from social networking sites and integrating the retrieved data into the operation of the communication device.

20 Claims, 13 Drawing Sheets

(56) References Cited

U.S. PATENT DOCUMENTS

| | | |
|---|---|---|
| 4,585,907 A | 4/1986 | Giammarrusco |
| 4,856,066 A | 8/1989 | Lemelson |
| 4,912,764 A | 3/1990 | Hartwell et al. |
| 4,996,707 A | 2/1991 | O'Malley et al. |
| 5,027,384 A | 6/1991 | Morganstein |
| 5,189,692 A | 2/1993 | Ferrara |
| 5,199,062 A | 3/1993 | Von Meister et al. |
| 5,283,818 A | 2/1994 | Klausner et al. |
| 5,327,486 A | 7/1994 | Wolff et al. |
| 5,544,230 A | 8/1996 | Megyesi |
| 5,572,576 A | 11/1996 | Klausner et al. |
| 5,581,604 A | 12/1996 | Robinson et al. |
| 5,621,891 A | 4/1997 | Ruhl et al. |
| 5,630,205 A | 5/1997 | Ekelund |
| 5,717,739 A | 2/1998 | Dyer et al. |
| 5,790,957 A | 8/1998 | Heidari |
| 5,917,893 A | 6/1999 | Katz |
| 5,920,835 A | 7/1999 | Huzenlaub et al. |
| 6,128,485 A | 10/2000 | Mori et al. |
| 6,249,808 B1 | 6/2001 | Seshadri |
| 6,301,338 B1 | 10/2001 | Makela et al. |
| 6,377,795 B1 | 4/2002 | Bach et al. |
| 6,404,860 B1 | 6/2002 | Casellini |
| 6,421,707 B1 | 7/2002 | Miller et al. |
| 6,507,643 B1 | 1/2003 | Groner |
| 6,577,859 B1 | 6/2003 | Zahavi et al. |
| 6,708,152 B2 | 3/2004 | Kivimaki |
| 6,741,678 B2 | 5/2004 | Cannell et al. |
| 6,823,184 B1 | 11/2004 | Nelson |
| 6,890,181 B2 | 5/2005 | Warneke et al. |
| 7,106,852 B1 | 9/2006 | Nelson et al. |
| 7,272,563 B2 | 9/2007 | Nelson |
| 7,286,649 B1 | 10/2007 | Nelson et al. |
| 7,305,068 B2 | 12/2007 | Tucker et al. |
| 7,317,908 B1 | 1/2008 | Eason |
| 7,418,381 B2 | 8/2008 | Blair |
| 7,443,962 B2 | 10/2008 | Basu |
| 7,519,042 B2 | 4/2009 | Gorday et al. |
| 7,627,608 B2 | 12/2009 | Strandell et al. |
| 7,650,170 B2 | 1/2010 | May et al. |
| 7,657,252 B2 | 2/2010 | Futami |
| 7,747,260 B2 | 6/2010 | Dowling et al. |
| 7,761,816 B2 | 7/2010 | Goldfarb et al. |
| 7,792,253 B2 | 9/2010 | Agapi et al. |
| 7,844,037 B2 | 11/2010 | Champlin et al. |
| 7,937,125 B2 | 5/2011 | May et al. |
| 8,005,194 B2 | 8/2011 | Venkataraman et al. |
| 8,019,056 B2 | 9/2011 | Worley et al. |
| 8,086,289 B2 | 12/2011 | May et al. |
| 8,229,086 B2 | 7/2012 | Bluvband |
| 8,229,409 B2 | 7/2012 | Bluvband et al. |
| 8,295,205 B2 | 10/2012 | Mazor et al. |
| 8,625,612 B2 | 1/2014 | Cuervo et al. |
| 2003/0095647 A1 | 5/2003 | Cromer et al. |
| 2003/0169151 A1 | 9/2003 | Ebling et al. |
| 2003/0228002 A1 | 12/2003 | Tucker et al. |
| 2004/0002329 A1 | 1/2004 | Bhatia et al. |
| 2004/0176114 A1 | 9/2004 | Northcutt |
| 2004/0235509 A1 | 11/2004 | Burritt et al. |
| 2004/0242213 A1 | 12/2004 | Benco et al. |
| 2005/0070286 A1 | 3/2005 | Awasthi et al. |
| 2005/0111646 A1 | 5/2005 | Bishop et al. |
| 2005/0287994 A1 | 12/2005 | Serafat et al. |
| 2006/0003758 A1 | 1/2006 | Bishop et al. |
| 2007/0117543 A1 | 5/2007 | Doulton |
| 2008/0133569 A1 | 6/2008 | Vu et al. |
| 2008/0133580 A1 | 6/2008 | Wanless et al. |
| 2008/0167014 A1 | 7/2008 | Novick et al. |
| 2008/0205655 A1 | 8/2008 | Wilkins et al. |
| 2009/0005981 A1 | 1/2009 | Forstall et al. |
| 2009/0141875 A1 | 6/2009 | Demmitt et al. |
| 2009/0164585 A1 | 6/2009 | Ahlin et al. |
| 2009/0172773 A1* | 7/2009 | Moore .............................. 726/1 |
| 2009/0180598 A1 | 7/2009 | Othmer et al. |
| 2009/0210917 A1 | 8/2009 | Lafreniere et al. |
| 2009/0259970 A1* | 10/2009 | Hawkins ........................ 715/810 |
| 2010/0030740 A1* | 2/2010 | Higgins et al. .................... 707/3 |
| 2010/0080365 A1 | 4/2010 | Seetharaman et al. |
| 2012/0099486 A1 | 4/2012 | Langos et al. |
| 2012/0220343 A1 | 8/2012 | Tsui et al. |

FOREIGN PATENT DOCUMENTS

| | | |
|---|---|---|
| EP | 0 851 647 A2 | 7/1998 |
| EP | 1 009 145 | 6/2000 |
| EP | 1 267 557 A1 | 12/2002 |
| EP | 1 379 061 A2 | 1/2004 |
| JP | 2000-324235 | 11/2000 |
| JP | 2001-168977 | 6/2001 |
| JP | 2002-142039 | 5/2002 |
| JP | 2003-008692 | 1/2003 |
| WO | WO 01/17275 | 3/2001 |
| WO | WO 2011/064678 | 6/2011 |
| WO | 2012/057943 A1 | 5/2012 |

* cited by examiner

Main system components

VVM client application

Voicemail server

Fig. 6

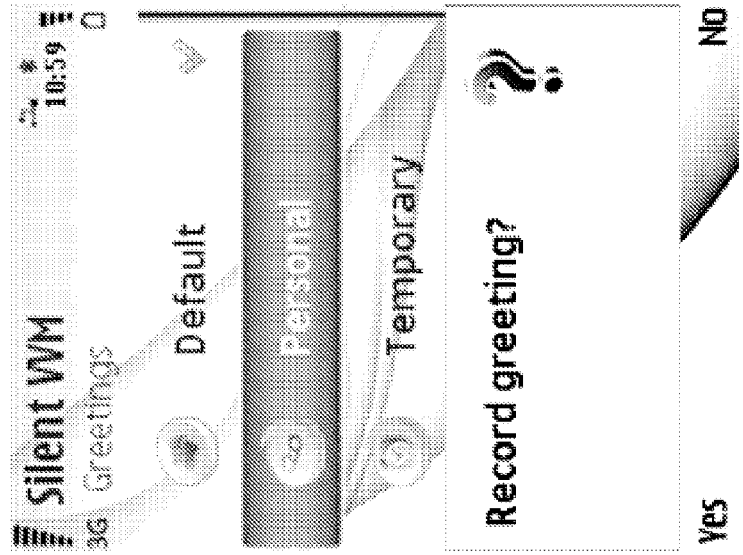
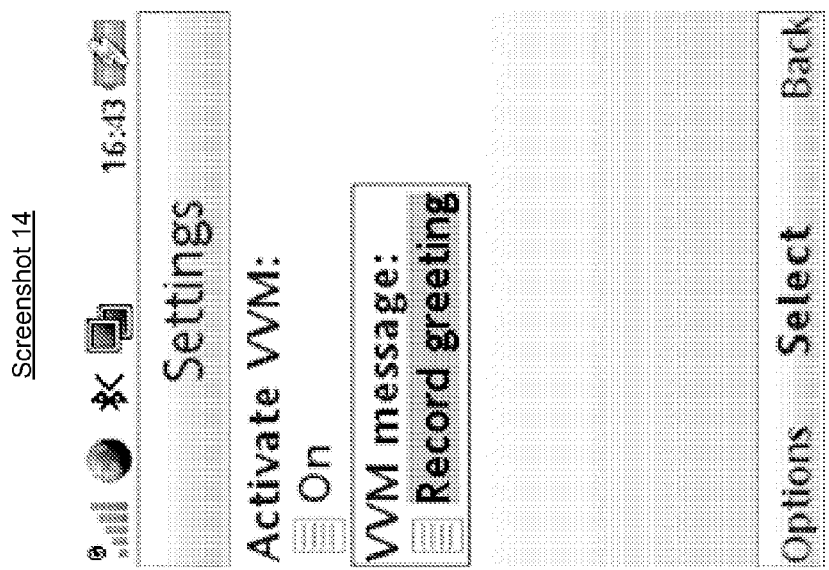
Fig. 8

SYSTEMS, METHODS, CIRCUITS AND ASSOCIATED SOFTWARE FOR AUGMENTING CONTACT DETAILS STORED ON A COMMUNICATION DEVICE WITH DATA RELATING TO THE CONTACT CONTAINED ON SOCIAL NETWORKING SITES

PRIORITY CLAIMS

This application is a continuation of U.S. patent application Ser. No. 12/777,528, filed by the inventors of the present invention, titled "Method, Circuit, System and Application for Providing Messaging Services", filed on May 11, 2010; and further claims priority from:
  a. U.S. Provisional Patent Application No. 61/255,113, filed by the inventors of the present invention, titled "System, Method, Circuit and Associated Software for Augmenting Contact Details Stored on a Communication Device with Data Relating to the Contact Contained on Social Networking Sites", filed on Oct. 27, 2009; and
  b. U.S. Provisional Patent Application No. 61/177,122, filed by the inventors of the present invention, titled "Method, Circuit, System and Application for providing messaging services", filed on May 11, 2009;
each of which is hereby incorporated herein by reference in their entirety, and the specification and figures of U.S. Provisional Patent Application No. 61/255,113 is included herein as an appendix of the present application and forms an integral part of the present application.

FIELD OF THE INVENTION

The present invention relates generally to the field of communication. More specifically, the present invention relates to systems, methods, circuits and associated software for augmenting contact details stored on a communication device with data relating to the contact contained on social networking sites.

BACKGROUND

In modern times, cellular phones serve their users for far more than just conversation. Therefore, modern cellular networks offer their users various value added services, such as web browsing, messaging, etc. In today's cellular networks many of the value added services are implemented on the network servers or by a third party connected to the network via a distributed data network, such as the internet. For this reason, a phone user can only access these services via an intermediate media service such as web browsing, dialing or IVR (Interactive Voice Response). This makes these services difficult and cumbersome to access and often entails an added charge for the intermediate media service. This fact, often times, may prevent or limit the activation and usage of these services.

Accordingly, there is a need in the field of communication, for cellular value added services, which services' design minimizes or negates the need of an intermediate media user access.

A social networking site focuses on building online communities of people who share interests and/or activities, or who are interested in exploring the interests and activities of others. Most social network services are web based and provide a variety of ways for users to interact, such as e-mail, instant messaging and blog like services. Social networking has encouraged new ways to communicate and share information. Social networking websites are being used regularly by millions of people.

In general, social networking services allow users to create a profile for themselves, and can be broken down into two broad categories: internal social networking (ISN); and external social networking (ESN) sites such as MySpace, Facebook, Twitter and Bebo. Both types can increase the feeling of community among people. An ISN is a closed/private community that consists of a group of people within a company, association, society, education provider and organization or even an "invite only" group created by a user in an ESN. An ESN is open/public and available to all web users to communicate and are designed to attract advertisers. ESN's can be smaller specialized communities (i.e. linked by a single common interest e.g. TheSocialGolfer, ACountryLife.Com, Great Cooks Community) or they can be large generic social networking sites (e.g. MySpace, Facebook etc.).

However, whether specialized or generic there is commonality across the general approach of social networking sites. Users can upload a picture of themselves, create their 'profile', add a textual and/or graphical description of what they have in mind right now, post videos and more. Users can often be "friends" with other users. In most social networking services, both users must confirm that they are friends before they are linked and able to share information with each other. For example, if Alice lists Bob as a friend, then Bob would have to approve Alice's friend request before they are listed as friends. Some social networking sites have a "favorites" feature that does not need approval from the other user. Social networks usually have privacy controls that allow the user to choose who can view their profile or contact them, etc.

Several social networks in Asian markets such as India, China, Japan and Korea have reached not only a high usage but also a high level of profitability. Services such as QQ (China), Mixi (Japan), Cyworld (Korea) or the mobile-focused service Mobile Game Town by the company DeNA in Japan (which has over 10 million users) are all profitable, setting them apart from their western counterparts.

Some social networks have additional features, such as the ability to create groups that share common interests or affiliations, upload or stream live videos, and hold discussions in forums. Geosocial networking co-opts internet mapping services to organize user participation around geographic features and their attributes.

Lately, mobile social networking has become popular. In most mobile communities, mobile phone users can now create their own profiles, make friends, participate in chat rooms, create chat rooms, hold private conversations, share photos and videos, and share blogs by using their mobile phone. Mobile phone users are basically open to every option that someone sitting on the computer has. Some companies provide wireless services which allow their customers to build their own mobile community and brand it, but one of the most popular wireless services for social networking in North America is Facebook Mobile. Other companies provide new innovative features which extend the social networking experience into the real world.

Mobile social networking is currently accomplished using a web browser or via stand-alone applications for mobile devices. Both options operate independently of the other communication functions of the mobile device. Therefore, although these applications may allow a user to perform virtually any action on the social networks that could be performed on a home computer, they do not take advantage of the data contained on these sites in order to improve the other communication functions performed by the mobile device.

Moreover, each application is site specific, communicating with only one social networking site. There is still a need for improved mobile social networking.

SUMMARY OF THE INVENTION

The present invention is a method, circuit, system and application for providing messaging services. According to some embodiments of the present invention, a VVM (Visual Voice Mail) system may include server-side component(s) (network side components) and client-side software application component(s) installed on a Remote Device (Remote Device=mobile communication/computing device such as a cell phone, feature phone, Java phone, smart phone, pocket PC, etc.).

According to some embodiments of the present invention, a VVM client application that may be a component in the client-side software application may be provided. The VVM client application may be adapted for installation or embedment on a Remote Device. The VVM client application may include a communication module adapted to communicate with the VVM server-side components over a data link such as, but not limited to, a data service (e.g. UMTS) provided by a cellular operator or a Wi-Fi service. The VVM server-side components may either be integral with a voicemail server and/or may interface with a voicemail server operated by a third party, such as a cellular operator.

According to further embodiments of the present invention, the VVM client application may communicate with more than one VVM server-side component, which VVM server-side components may be integral and/or may interface with more than one voicemail server, possibly of different types. For example, the VVM client application may communicate with a VVM server-side component integral with and/or interfacing with a wireless mailbox and a VVM server-side component integral with and/or interfacing with a wireline mailbox at the same time. Accordingly, the VVM client application may support more than one voicemail protocol.

The VVM server-side component(s) may be adapted to monitor a functionally associated voicemail server (i.e. voicemail server with which it is integral or interfacing) for voicemail activities related to one or more voicemail accounts. Such activities may include, but are not limited to, addition, modification or removal of voicemail entries. Exemplary voicemail entries may include, but are not limited to, one or more of the following: (1) a Voicemail message—a message deposited into the account by a third party or by the account's owner, (2) a Greeting—Outgoing Message (OGM)—a recording which is played as a welcome message for a party that has called the user and has been directed to voicemail, (3) Other entries that may include voicemail account related data (e.g. an entry confirming whether a certain voice message has already been transferred/copied to, and stored on, a user's remote device). A voicemail message may include one or more of the following media types: (1) Audio, (2) Video, (3) Fax, (4) Text transcription of the audio, (5) General text attached to the voicemail message, (6) images, (7) Metadata relating to the entry, (8) email and/or (9) any other media type known today, or to be devised in the future.

According to some embodiments of the present invention, upon detecting a voicemail activity or change in a voicemail server account being monitored, for instance, when: (1) a new voicemail message(s) has arrived in a given user's voicemail account, (2) a new greeting was recorded, (3) a voicemail entry was deleted, (4) a voicemail entry was updated due to server or user activities, (5) a voicemail's account parameters were updated (e.g. the password was changed); the VVM server-side component(s) may send a "status changed" trigger signal to the given user's VVM client application. The trigger signal may, for example, be in the form of a coded short message service ("sms") message sent to the user's remote device. The coded signal may contain information regarding the change made in the voicemail server account and/or information required to access the account. According to further embodiments of the present invention, the VVM client application may be adapted to configure the remote device to suppress or otherwise avoid issuing notifications of said received coded sms messages intended for the VVM client application. Such SMS notifications may be distinguished from other sms messages according to content, application port or any other appropriate method.

According to some embodiments of the present invention, one or more of the VVM server-side component(s) may automatically encode (e.g. using AMR, MP3, ACC, 3GPP, Jpeg, GIF, AVI, or any other media type) and/or convert a copy of voicemail entries stored on the voicemail server into an encapsulated data structure suitable for transmission over a data link. Associated with each voicemail entry copy may be one or more parameters (metadata) associated with the voicemail entry from which the copy was made. Such exemplary parameters may include (1) date and time of voicemail entry, (2) length of voicemail entry content, (3) message origination details (e.g. phone number of phone from which message was recorded), (4) listened/not-yet-listened indicator, (5) is-deleted indicator, and/or (6) any other relevant data; all of which may be stored along with or as metadata within or otherwise associated with an entry copy file.

According to some embodiments of the present invention, the VVM client application may be adapted to initiate a synchronization process between the VVM client application storage and the VVM server-side component(s) storage. The VVM client application may initiate a synchronization: (1) Immediately and automatically upon receipt of a "status changed" signal (e.g. a coded sms message, a data message or any other signaling mechanism) from the VVM server-side component(s), (2) whenever the network is unavailable to the remote device (e.g. "out of range"), upon return of availability, (3) when manually triggered to do so by a user, (4) periodically, and/or (5) after a "status changed" signal has been received and (2), (3) or (4) have occurred.

According to some embodiments of the present invention, the synchronization process may include: (1) a transfer of one or more voicemail entry copies and their accompanying parameters, from the VVM server-side component(s) to the VVM client application and/or vice versa, (2) an update of one or more of a voicemail's accompanying parameters in the VVM server-side component(s) storage and/or the VVM client application storage, (3) a permanent or temporary deletion of one or more voicemail entries including its accompanying parameters from the VVM server-side component(s) storage or VVM client application storage, (4) a forwarding of one or more voicemail entries to another voicemail account, and/or (5) a deposit of a one or more new voicemail entries in the user's own voicemail account or another voicemail account belonging to a different user.

The synchronization mechanism may be optimized for speed, cost or any other parameter that may be useful for this process or required to deliver better service.

According to further embodiments of the present invention, the synchronization process may be automatically triggered from time to time at the discretion of the VVM client application, in response to local storage changes or time based for example, local entry deletion, local entry being listened to, etc.

According to further embodiments of the present invention, the VVM client application may store the retrieved message copies locally on the remote device's non-volatile memory, which memory may either be integral with the communication device or part of a mass storage device connected to or otherwise associated with the remote device. According to further embodiments of the present invention, after storage of a message copy on the remote device's local memory, the VVM client application may signal a receipt confirmation to the VVM server-side components and the VVM server-side components may erase their message copies, along with associated parameters. Alternatively, according to further embodiments of the present invention, in response to a receipt confirmation message signal from the VVM client application, the VVM server-side components may mark the message copies as having been transferred rather than erasing them.

According to further embodiments of the present invention, one or more of the VVM server-side components may include, or be functionally associated with, a speech recognition module including speech recognition algorithms adapted to convert an audio portion of a stored voice message into a text string. Once created, the text string may be associated with the voice message from which it was derived, for example as an accompanying file. According to some embodiments of the present invention, at least a portion of the text string may be stored as metadata associated with a copy of voice message from which the text string was derived. The text string may be stored (e.g. in the voicemail message as one of the accompanying parameters) and may be transferred along with or instead of the message copy. A user of the VVM client application may select through an interface menu a preference as to whether to receive only voice message copies, only text string copies or a combination of the two.

According to some embodiments of the present invention, the VVM client application may be adapted to present a listing of locally stored voice messages, along with related parameters and/or metadata, as a list of items (e.g. on a scroll down menu). The VVM client application may also present the available voice messages in the phone inbox that is traditionally used to list SMS and MMS messages, in a separate listing or both. The VVM client application may also associate the phone's media player or a special media player or any other media player to the message. The VVM client application may also access the user's contacts and indicate the name of any contact whose phone number corresponds with the phone number from which a message has originated.

The VVM client application may provide a user with options including: (1) play/view stored message, (2) read associated metadata, and/or (3) delete any or all of the locally stored messages/data. When a user selects a locally stored message copy, the application may use a decoder, corresponding to the encoder used by the VVM server-side component(s) to create the copy, to convert the stored message copy into (1) an audible signal which it may then play to the user through a transducer (e.g. speaker) on the remote device, (2) a video or image signal which it may then display to the user on the remote device, and/or (3) any other media type suitable for presenting the stored message copy to the user on the remote device. When a user deletes a locally stored message, the VVM client application may send a signal back to the VVM server-side component(s), either separately or as part of a synchronization process, indicating which message was deleted, and the VVM server-side component(s) may delete the corresponding message from the voicemail server and the corresponding message metadata/copy, if the message copy was not previously deleted. According to further embodiments of the present invention, the VVM client application may be further adapted to allow a user to access and utilize metadata associated with a voice message for other applications, such as to copy the details of the origination of a voice message to his/her local contacts. The VVM client application may also be adapted to allow a user to create/edit/delete/forward an outgoing message.

According to some embodiments of the present invention, the VVM client application may include a VVM server-side component interface module adapted to interface with VVM server-side components over a data link. The interface module may use interface parameters stored on a configuration file in order to determine a protocol for establishing and maintaining communication with VVM server-side components. Since different voicemail servers provide different APIs using different protocols for interfacing with their voicemail systems, different protocols may be required when communicating with different voicemail systems and/or their respective server-side components. According to further embodiments of the present invention the VVM client application may also support various types of server components.

The configuration data associated with a VVM client application on a given remote device may be remotely swapped or edited using a configuration sms. A cellular operator providing voicemail server functionality in accordance with embodiments of the present invention may send a customized configuration sms to the remote device, which customized configuration sms may provide the VVM client application with configuration data corresponding to the operator's voicemail server protocols.

According to some embodiments of the present invention, a VVM client application user interface may include part or all of the following exemplary functionalities:

| | |
|---|---|
| General | New message popup - opens VVM |
| | Open VVM from application menu |
| | Browse and listen in any order |
| | Caller ID correlation with local contacts |
| Message function | Call back |
| | Reply via SMS |
| | Forward via MMS |
| | Forward via Email |
| | Add/update caller ID in local contacts |
| | Archive (store in archive - on device or on server) |
| | Delete (from server and client) |
| | Sort message (date, caller) |
| Icon indication | Read/unread |
| | Replied |
| | Forwarded |
| | Called back |
| Player function | Play/pause |
| | Fast forward/rewind |
| | Play to loud speakers/private speaker |
| | Volume control |
| Greeting management | Record new greeting |
| | Support different greeting types (full, VS, temporary . . . ) |
| | Activate/deactivate greeting |
| | Delete greeting |
| New user tutorial | Free test and images |
| | triggered actions (example - greeting recording) |
| | Integrated help |

According to some embodiments of the present invention, a VVM network support may include part or all of the following exemplary characteristics/capabilities/variants:

| | |
|---|---|
| IMAP variants | General IMAP |
| | Comverse |
| | Unisys |
| | Ericsson |
| | Alcatel Lucent |
| HTTP variant | Acision |
| | Proprietary in house |

| | |
|---|---|
| Security | Secured Sockets Layer (SSL) |
| | StartTLS |
| | MD5- Digest authentication |
| Message type support | Voice (AMR, WAV, MP3 ...) |
| | Video (3GPP, MP4, ...) |
| | Fax (GIF, BMP, JPEG, etc.) |

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6: are exemplary screenshots (10-11) of a VVM client application running in a Windows Mobile environment, according to some embodiments of the present invention.

FIG. 8: are exemplary screenshots (14-15) of a Greeting Provisioning screen within a VVM client application, according to some embodiments of the present invention.

Figure 1A:
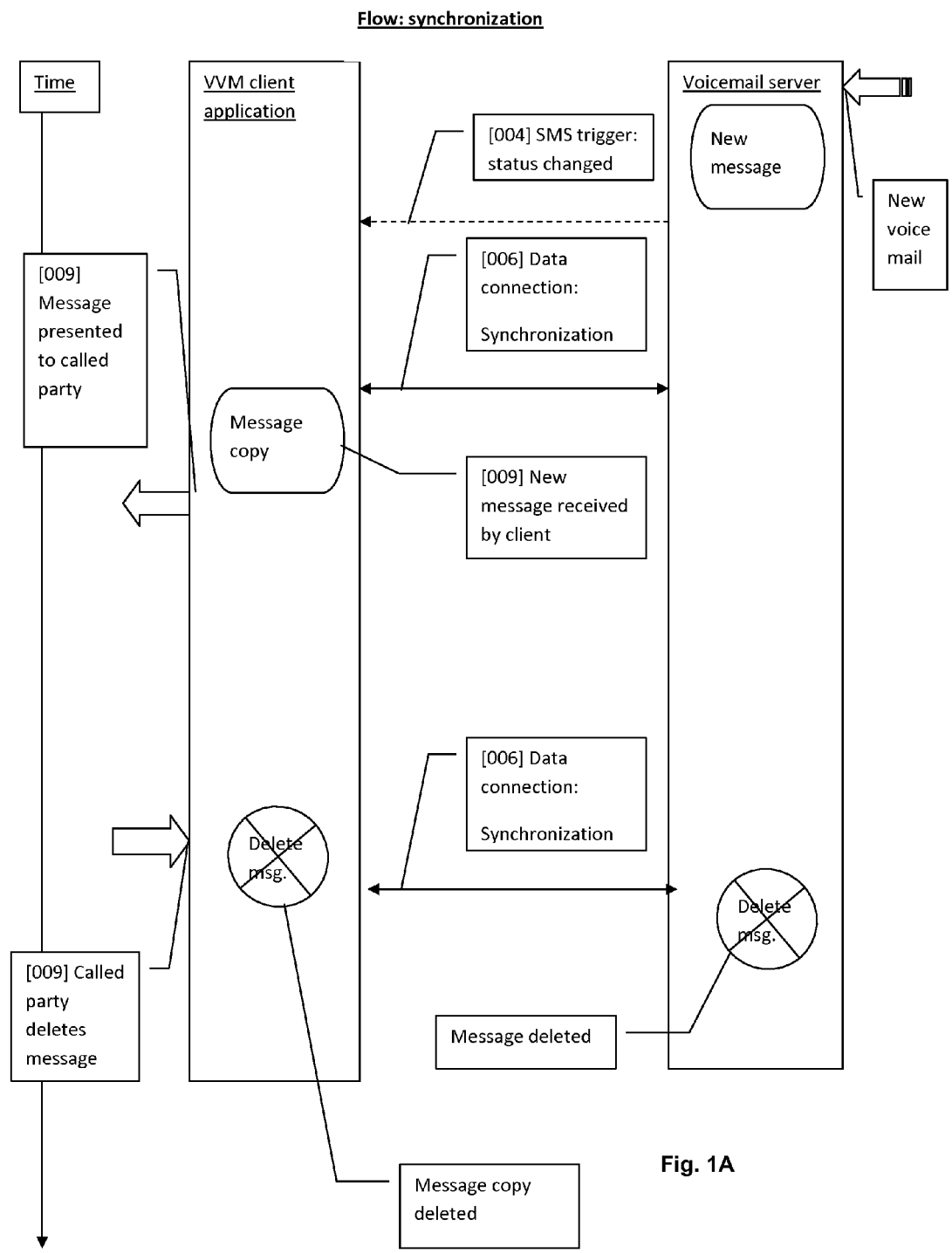
FIG. 1A: is a flow chart showing the steps of an exemplary synchronization process, in accordance with some embodiments of the present invention.
Figure 1B:
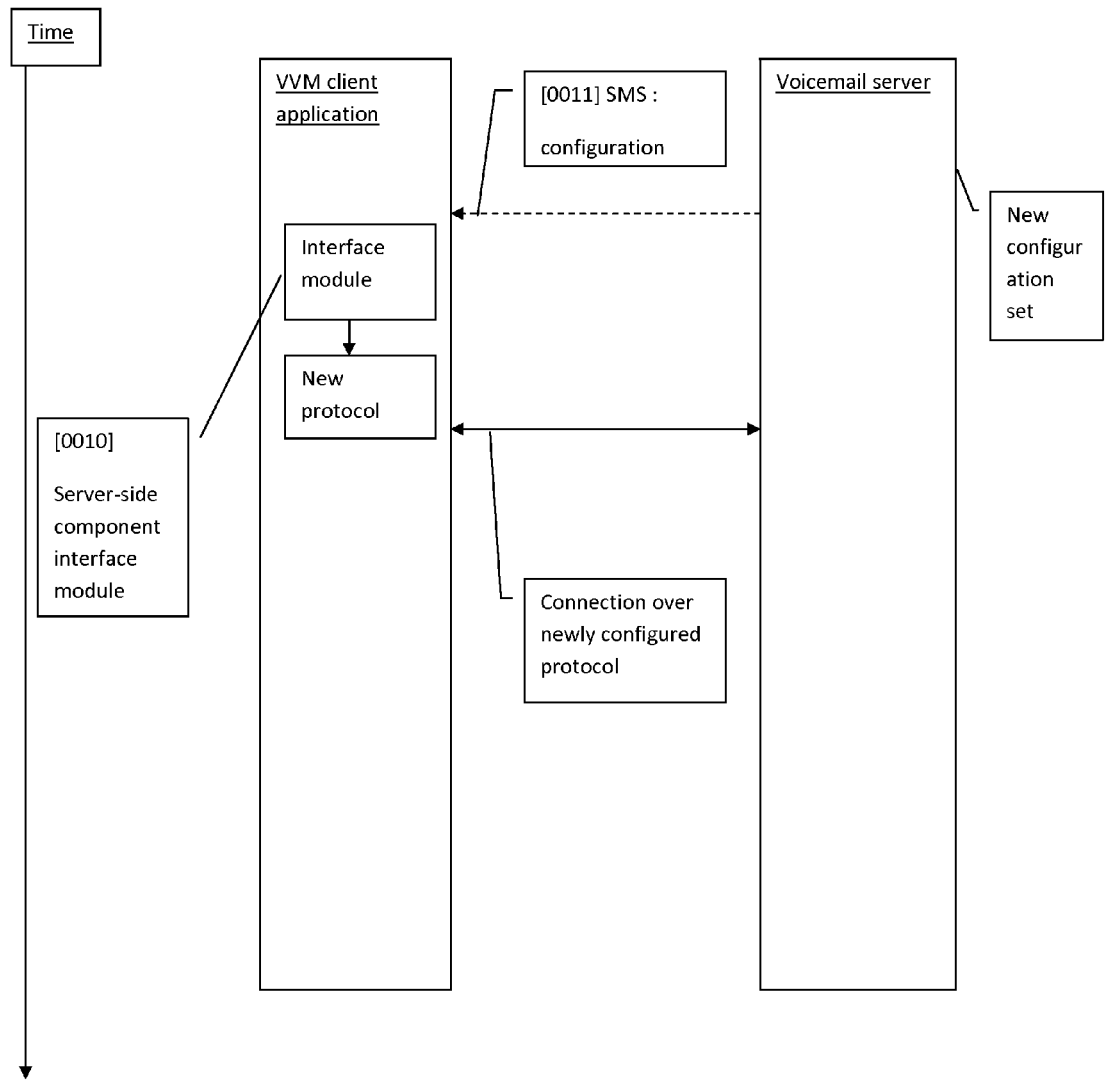
FIG. 1B: is a flow chart showing the steps of an exemplary dynamic protocol configuration process, in accordance with some embodiments of the present invention.
Figure 1C:
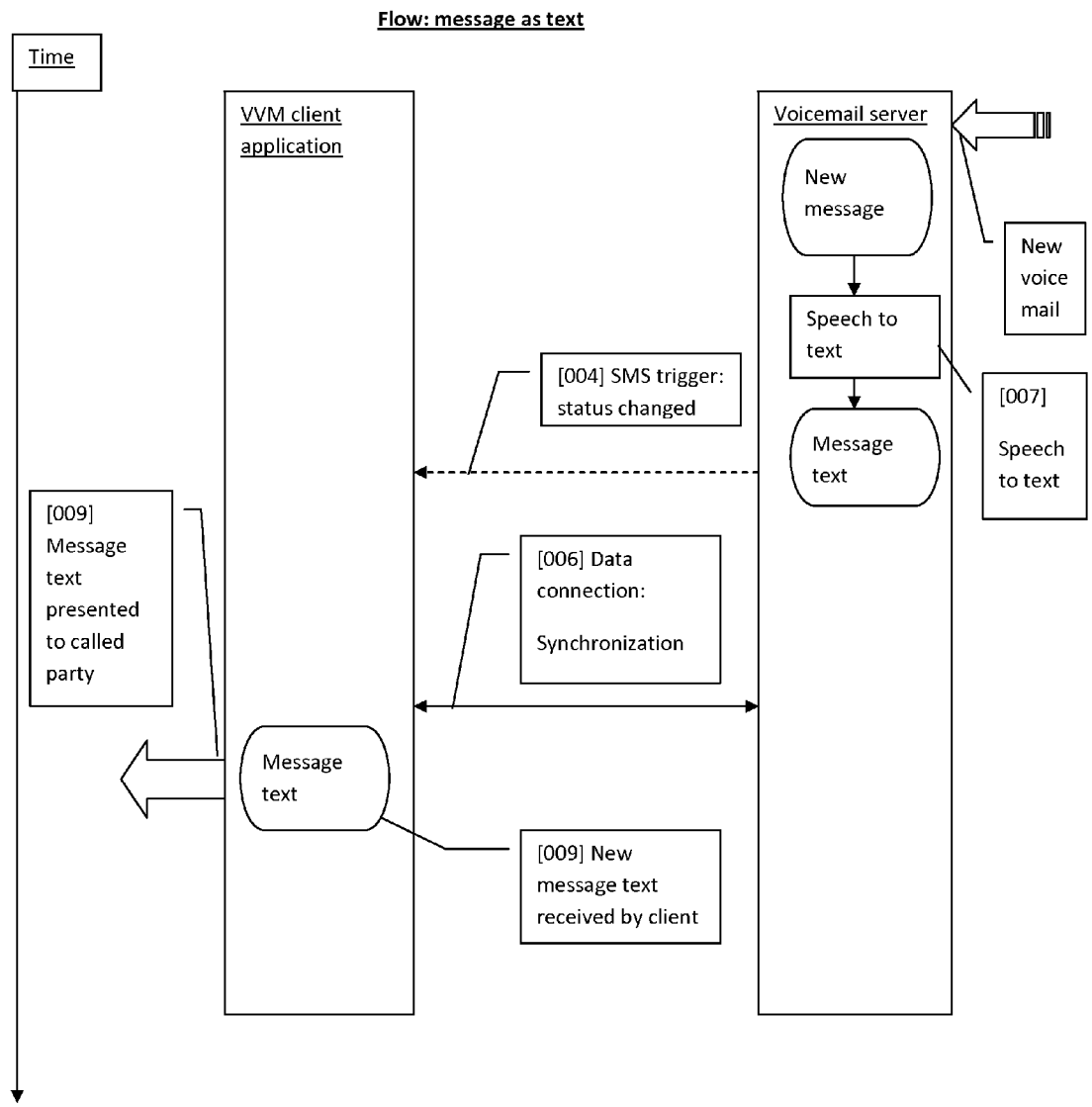
FIG. 1C: is a flow chart showing the steps of an exemplary voicemail-message to message-as-text process, in accordance with some embodiments of the present invention.
Figure 2A:
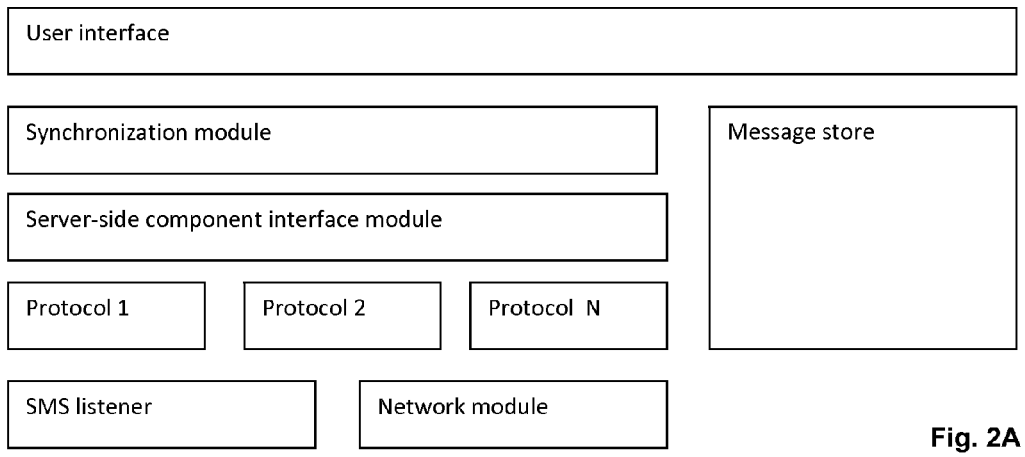
FIG. 2A: is a block diagram, showing the main components of an exemplary VVM client application, in accordance with some embodiments of the present invention.
Figure 2B:
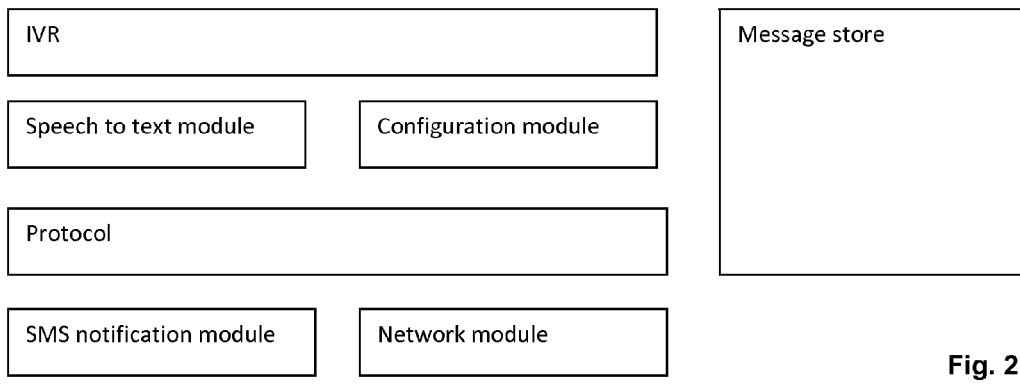
FIG. 2B: is a block diagram, showing the main components of an exemplary VVM Server-side component(s), in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, including mobile phone or any mobile device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer or phone or any other computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Terms in this application relating to distributed data networking, such as send or receive, may be interpreted in reference to Internet protocol suite, which is a set of communications protocols that implement the protocol stack on which the Internet and most commercial networks run. It has also been referred to as the TCP/IP protocol suite, which is named after two of the most important protocols in it: the Transmission Control Protocol (TCP) and the Internet Protocol (IP), which were also the first two networking protocols defined. Today's IP networking represents a synthesis of two developments that began in the 1970s, namely LANs (Local Area Networks) and the Internet, both of which have revolutionized computing.

The Internet Protocol suite—like many protocol suites—can be viewed as a set of layers. Each layer solves a set of problems involving the transmission of data, and provides a well-defined service to the upper layer protocols based on using services from some lower layers. Upper layers are logically closer to the user and deal with more abstract data, relying on lower layer protocols to translate data into forms that can eventually be physically transmitted. The TCP/IP reference model consists of four layers.

Layers in the Internet Protocol Suite

The IP suite uses encapsulation to provide abstraction of protocols and services. Generally a protocol at a higher level uses a protocol at a lower level to help accomplish its aims. The Internet protocol stack has never been altered, by the IETF, from the four layers defined in RFC 1122. The IETF makes no effort to follow the seven-layer OSI model and does not refer to it in standards-track protocol specifications and other architectural documents.

| | |
|---|---|
| 4. Application | DNS, TFTP, TLS/SSL, FTP, Gopher, HTTP, IMAP, IRC, NNTP, POP3, SIP, SMTP, SNMP, SSH, TELNET, ECHO, RTP, PNRP, rlogin, ENRP Routing protocols like BGP, which for a variety of reasons run over TCP, may also be considered part of the application or network layer. |
| 3. Transport | TCP, UDP, DCCP, SCTP, IL, RUDP |
| 2. Internet | Routing protocols like OSPF, which run over IP, are also to be considered part of the network layer, as they provide path selection. ICMP and IGMP run over IP and are considered part of the network layer, as they provide control information. IP (IPv4, IPv6) ARP and RARP operate underneath IP but above the link layer so they belong somewhere in between. |
| 1. Network access | Ethernet, Wi-Fi, token ring, PPP, SLIP, FDDI, ATM, Frame Relay, SMDS |

It should be understood that any topology, technology and/or standard for computer networking (e.g. mesh networks, infiniband connections, RDMA, etc.), known today or to be devised in the future, may be applicable to the present invention.

The present invention includes methods, circuits, systems and applications for providing messaging services. According to some embodiments of the present invention, a VVM (Visual Voice Mail) system may include server-side component(s) (network side components) and client-side software application component(s) installed on a Remote Device (Remote Device=mobile communication/computing device such as a cell phone, feature phone, Java phone, smart phone, pocket PC, etc.).

The present invention also includes systems, methods, circuits and associated software for augmenting contact details stored on a communication device, such as a mobile phone, with data relating to the contact contained on social networking sites (hereby: "SNS"). According to some embodiments of the present invention, there may be provided a synchronization engine (hereby: "SE"), which SE may be adapted to reside on the operating memory of a communication device, such as a cellular phone. The SE may be adapted to collect data from SNS's, via social network adapters, and to display and/or store the collected data on the communication device and may be further adapted to integrate the collected data into the operation of the communication device, which may include integrated usage of the information with any of the device's embedded functionalities.

According to some embodiments of the present invention, a SE may be installed on, or be otherwise functionally associated with a communication device. Upon initial instancement, the SE may be adapted to prompt the user to input the SNS's of which he is a member and his/her credentials (username, password, etc.) for access to each of the SNS's inputted. According to further embodiments of the present invention, the SE may be adapted to detect independently what SNS's a user is a member of. The SE may then access the user's profiles on the inputted SNS's using the credentials provided by the user. Subsequently, the SE may compare the contacts stored on the communication device to the user's contacts/"friends" on the SNS's to search for individual profiles on the SNS's that are associated with contacts stored on the communication device. The SE may be adapted to recognize corresponding profiles even in cases that the name is not spelled exactly the same or is otherwise slightly different from the details stored on the communication device regarding the specific contact. This may be performed using special heuristics that can perform a few types of comparisons and correlations that cover those cases where the contact name is not identical in the phone contact and in the SNS's. This algorithm may search for permutations on a specific name and/or may compare additional information in suspected cases, for example it may compare the associated e-mail or residential address as well as additional parameters. Once the SE has correlated a contact with a specific profile on a SNS, it may store a pointer/link to that profile for future updates of data, relating to the contact, from the SNS. According to yet further embodiments of the present invention, once the correlation between one or more contacts stored on the communication device and one or more profiles stored on one or more SNS's is established, the SE may be further adapted to allow a user to perform actions relating to the correlated contacts, on one or more SNS's, via the communication device and/or to use the contact list stored on the communication device while performing actions on a SNS.

According to further embodiments of the present invention, the SE may be further adapted to collect data relating to the corresponding contacts, such as the contact's homepage URL, birthday, spouse, company, title, phone #, e-mail and more from those contact's profiles on the SNS's and according to further embodiments of the present invention, may store the collected data on the communication device's database and/or on an exterior database, possibly associated with the provider of the SE, the provider of the communication device and/or the provider of the communication service.

According to further embodiments of the present invention the SE may be further adapted to update/augment the data associated with a specific contact on one or more SNS's based on data relating to that contact stored on the communication device and/or based on user request.

According to some embodiments of the present invention, the SE may communicate with the SNS's via SNS adapters, which SNS adapters may communicate with SNS's via application programming interfaces (hereby: "API") provided by the SNS's. The SNS adapters may be adapted to translate communications from the SE into protocols used by the API's and vice versa. Each SNS adapter may be adapted to communicate with one or more SNS's and may be further adapted to optimize communications according to specific parameters, such as band width consumption. The SE may be adapted to aggregate and synchronize the data relating to each contact, collected from different SNS's, possibly through multiple SNS adapters.

According to further embodiments of the present invention, there may be provided a presentation and operation module (hereby: "P&O module"), which P&O module may be adapted to reside on the operating memory of a communication device or otherwise be functionally associated with a communication device. The P&O module may be adapted to communicate with the processor/controller of a communication device and to cause the processor/controller to present to a user data collected from SNS's, relating to a contact stored on the communication device's database. For example, the P&O module may display the contact's latest "profile picture" or "tag line", from a social networking website (such as facebook), when the contact details are displayed. The P&O module may cause the processor/controller to present to a user data, collected from SNS's, relating to a contact, when the communication device is communicating with the contact, when a user accesses the contact's information, upon request and/or at any other time the contact's details are presented to the user. The P&O module may retrieve the data collected from SNS's relating to a contact directly from the communication device's database, an external database (in the event that the data is stored on an external database) and/or via the SE.

According to yet further embodiments of the present invention, the SE may be adapted to collect data relating to a contact, from SNS's, periodically, substantially continuously, when triggered by the user and/or upon the occurrence of an event involving the specific contact, such as if the specific contact calls the communication device. The SE may be adapted to recognize and collect only data that has been updated since the previous data collection performed by the SE. According to further embodiments of the present invention, the SE may collect data associated with certain contacts more often than others, based on predefined criteria, such as the frequency of communication with the contact ("frequently used"), the last time the contact was used by the communication device ("recently used") and/or any other relevant distinction.

According to some embodiments of the present invention, a VVM client application that may be a component in the client-side software application may be provided. The VVM client application may be adapted for installation or embedment on a Remote Device. The VVM client application may include a communication module adapted to communicate with the VVM server-side components over a data link such as, but not limited to, a data service (e.g. UMTS) provided by a cellular operator or a Wi-Fi service. The VVM server-side components may either be integral with a voicemail server and/or may interface with a voicemail server operated by a third party, such as a cellular operator.

According to further embodiments of the present invention, the VVM client application may communicate with more than one VVM server-side component, which VVM server-side components may be integral and/or may interface with more than one voicemail server, possibly of different types. For example, the VVM client application may communicate with a VVM server-side component integral with and/or interfacing with a wireless mailbox and a VVM server-side component integral with and/or interfacing with a wireline mailbox at the same time. For that the VVM client application may support more than one voicemail protocol.

The VVM server-side components may be integral with a voicemail server (Voicemail Server=a server which provides voicemail services to users). Alternatively, the VVM server side components may be adapted to interface with one or more voicemail servers used by or associated with cellular operators, possibly via API's associated with the voicemail servers. For this purpose, the VVM server-side components may be adapted to work with different protocols associated with different voicemail servers and may be adapted to check which protocol is associated with a voicemail server and communicate with it accordingly.

The VVM server-side component(s) may be adapted to monitor a functionally associated voicemail server (i.e. voicemail server with which it is integral or interfacing) for voicemail activities related to one or more voicemail accounts. Such activities may include, but are not limited to, addition, modification or removal of voicemail entries. Exemplary voicemail entries may include, but are not limited to, one or more of the following: (1) a Voicemail message—a message deposited into the account by a third party or by the account's owner, (2) a Greeting—Outgoing Message (OGM)—a recording which is played as a welcome message for a party that has called the user and has been directed to voicemail, (3) Other entries that may include voicemail account related data (e.g. an entry confirming whether a certain voice message has already been transferred/copied to, and stored on, a user's remote device). A voicemail message may include one or more of the following media types: (1) Audio, (2) Video, (3) Fax, (4) Text transcription of the audio, (5) General text attached to the voicemail message, (6) images, (7) Metadata relating to the entry, (8) email and/or (9) any other media type known today, or to be devised in the future.

According to some embodiments of the present invention, upon detecting a voicemail activity or change in a voicemail server account being monitored, for instance, when: (1) a new voicemail message(s) has arrived in a given user's voicemail account, (2) a new greeting was recorded, (3) a voicemail entry was deleted, (4) a voicemail entry was updated due to server or user activities, (5) a voicemail's account parameters were updated (e.g. the password was changed); the VVM server-side component(s) may send a "status changed" trigger signal to the given user's VVM client application. The trigger signal may, for example, be in the form of a coded short message service ("sms") message sent to the user's remote device. The coded signal may contain information regarding the change made in the voicemail server account and/or information required to access the account. According to further embodiments of the present invention, the VVM client application may be adapted to configure the remote device to suppress or otherwise avoid issuing notifications of said received coded sms messages intended for the VVM client application.

According to some embodiments of the present invention, one or more of the VVM server-side component(s) may automatically encode (e.g. using AMR, MP3, ACC, 3GPP, Jpeg, GIF, AVI, or any other media type) and/or convert a copy of voicemail entries stored on the voicemail server into an encapsulated data structure suitable for transmission over a data link. For example, a VVM server-side component may be adapted to encode audio messages as mp3 files. Associated with each voicemail entry copy may be one or more parameters (metadata) associated with the voicemail entry from which the copy was made. Such exemplary parameters may include (1) date and time of the voicemail entry, (2) length of the voicemail entry content, (3) message origination details (e.g. phone number of phone from which message was recorded), (4) a listened/not-yet-listened indicator, (5) is-deleted indicator, and/or (6) any other relevant data; all of which may be stored along with or as metadata within or otherwise associated with an entry copy file.

According to some embodiments of the present invention, the VVM client application may include a synchronization module adapted to initiate a synchronization process between the VVM client application storage and the VVM server-side component(s) storage. The VVM client application may initiate a synchronization: (1) Immediately and automatically upon receipt of a "status changed" signal (e.g. a coded sms message, a data message or any other signaling mechanism) from the VVM server-side component(s), (2) whenever the network is unavailable to the remote device (e.g. "out of range"), upon return of availability, (3) when manually triggered to do so by a user, (4) periodically, (5) upon activation, and/or (6) after a "status changed" signal has been received and (2), (3) or (4) have occurred.

According to some embodiments of the present invention, the synchronization process may include: (1) a transfer of one or more voicemail entry copies and their accompanying parameters, from the VVM server-side component(s) to the VVM client application and/or vice versa, (2) an update of one or more of a voicemail's accompanying parameters in the VVM server-side component(s) storage and/or the VVM client application storage, (3) a permanent or temporary deletion of one or more voicemail entries including its accompanying parameters from the VVM server-side component(s) storage or VVM client application storage, (4) a forwarding of one or more voicemail entries to another voicemail account, and/or (5) a deposit of a one or more new voicemail entries in the user's own voicemail account or another voicemail account belonging to a different user. In other words, a synchronization process may include:

a. updating the VVM client application with any voicemail activities that have occurred on the voicemail server, relating to the user's account, since the last synchronization; and b. updating the VVM server-side component(s) with any actions the user has taken within the VVM client application, on his remote device, since the last synchronization.

According to further embodiments of the present invention, the synchronization process may be automatically triggered from time to time at the discretion of the VVM client application, in response to local storage changes or time based for example, local entry deletion, local entry being listened to, etc. For example, in circumstances that the storage associated with the VVM client application is full, the VVM client application may initiate a synchronization process as soon as storage becomes available (e.g. the user has deleted one or more stored messages). According to yet further embodiments of the present invention, in certain cases where the voicemail server is unavailable, the VVM client application may perform a synchronization with the voicemail server through a dial-up connection with the TUI interface of the voicemail server. The dial-up synchronization may be dependent on a user authorization or confirmation of the action.

According to further embodiments of the present invention, the VVM client application may include a voicemail storage module adapted to store the retrieved message copies locally on the remote device's non-volatile memory, which memory may either be integral with the communication device or part of a mass storage device connected to, or otherwise associated with, the remote device. According to further embodiments of the present invention, after storage of a message copy on the remote device's local memory, the VVM client application may signal a receipt confirmation to the VVM server-side components and in response the VVM server-side components may erase their message copies, along with any associated data. The VVM server-side component(s) may retain a portion of the data associated with deleted messages as a record. Alternatively, according to further embodiments of the present invention, in response to a receipt confirmation message signal from the VVM client application, the VVM server-side components may mark the message copies as having been transferred rather than erasing them.

According to further embodiments of the present invention, one or more of the VVM server-side components may include, or be functionally associated with, a speech recognition module including speech recognition algorithms adapted to convert an audio portion of a stored voice message into a text string. Once created, the text string may be associated with the voice message from which it was derived, for example as an accompanying file. According to some embodiments of the present invention, at least a portion of the text string may be stored as metadata associated with a copy of the voice message from which the text string was derived. The text string may be stored (e.g. in the voicemail message as one of the accompanying parameters) and may be transferred along with or instead of the message copy. A user of the VVM client application may select through an interface menu a preference as to whether to receive only voice message copies, only text string copies or a combination of the two. For example, the speech recognition module may be adapted to convert the first sentence of each voicemail into a text string, which text-string may then be included within the metadata associated with the voicemail as an identifier or preview. In another example, the speech recognition module may be adapted to identify certain key words or phrases (e.g. names, locations, "urgent", etc.) and convert them into a text string, which text-string may then be included within the metadata associated with the voicemail as an identifier or preview.

According to further embodiments of the present invention, the VVM client application may include or be functionally associated with a speech recognition module, which may function as described above, but from the client side. According to yet further embodiments of the present invention, the VVM client application may be adapted to interface, via a communication module, with a third party audio-to-text service provider (Audio-to-text service provider=a party that provides the services of conversion of audio media into text strings). The VVM client application may be adapted to send audio files associated with a voice message to said third party and to receive from said third party a text string derived by the third party from the audio files. The VVM client application may then store the received text string as metadata of the voice message. The VVM client application may be further adapted to update the voicemail server with the new metadata, immediately and/or during the following synchronization. Similarly, the VVM client application may be adapted to communicate with any relevant third party service provider to perform any analysis or conversion of voicemails stored on the remote device.

According to some embodiments of the present invention, the VVM client application may include an interface module adapted to present a listing of locally stored voice messages, along with related parameters and/or metadata, as a list of items (e.g. on a scroll down menu) or in any other appropriate form. The interface module may also present the available voice messages in the phone inbox that is traditionally used to list SMS and MMS messages. The VVM client application may also associate the phone's media player or a special media player or any other media player to the message.

According to some embodiments of the present invention, the VVM client application may also access the list of contacts details stored on the remote device and correlate the origin of stored voice messages (e.g. the phone number from which the message originated) with matching contacts on the remote device. Accordingly, details relating to contacts, stored on the remote device, may be associated with correlating voice messages as metadata and may be displayed to the user along with the other metadata associated with the stored voice messages.

The VVM client application may provide a user with options including: (1) play/view stored messages, (2) read associated metadata, and/or (3) delete any or all of the locally stored messages/data. When a user selects to playback a locally stored message copy, a playback module contained in the application may use a decoder, such as an audio, video or image decoder, corresponding to the encoder used by the VVM server-side component(s) to create the copy, to convert the stored message copy into (1) an audible signal which it may then play to the user through a transducer (e.g. speaker) on the remote device, (2) a video or image signal which it may then display to the user on the remote device, and/or (3) any other media type suitable for presenting the stored message copy to the user on the remote device. When a user deletes a locally stored message, the VVM client application may send a signal back to the VVM server-side component(s), either separately or as part of a synchronization process, indicating which message was deleted, and the VVM server-side component(s) may delete the corresponding message from the voicemail server and the corresponding message metadata/copy, if the message copy was not previously deleted. Again, the VVM server-side component(s) may retain a portion of the data associated with deleted messages as a record. When a message is independently erased/deleted from the voicemail server (for example, due to the passage of time) the VVM client application may or may not delete the corresponding message from the remote device's storage during the following synchronization. The decision whether to delete the corresponding message may be based on a specific user input (i.e. the application may prompt the user to decide whether to delete the specific message) or a general user preference setting within the VVM client application settings.

According to further embodiments of the present invention, the VVM client application may be further adapted to allow a user to access and utilize metadata associated with a voice message for other applications. For example, a user may be able to: (1) copy the details of the depositor/sender of a voicemail into his local contacts, (2) reply to the depositor/sender of a voicemail via sms, mms or direct call, (3) forward the voice message via email, etc.

According to further embodiments of the present invention, the VVM client application may be further adapted to communicate with additional service providers, such as advertising servers, social network servers, text transcription servers or any other relevant service provider. The VVM client application may communicate with these service providers via API's provided by said service providers and may include or be adapted to retrieve the appropriate protocols for these communications. The VVM client application may be adapted to retrieve from these service providers data relating to voicemails stored on the remote device, such as further contact details, and to associate this data with the relevant voice message. For example, the VVM client application may correlate data associated with a voice message, such as the origin, with data contained in a profile stored on a social network server and may be adapted to associate other data contained in the same profile, such as a profile picture, with the specific voice message. Similarly, a contact name associated with a voicemail may be correlated with a facebook profile, for example. In this fashion, a user may be displayed a current profile picture from facebook of the depositor of a voicemail, aside the listing of the stored voicemail.

For a detailed description of the interfacing between a communication application client application and social networking service providers please refer to: U.S. Provisional Patent Application No. 61/255,113, filed by the inventors of the present invention, Titled "System, Method Circuit and Associated Software for Augmenting Contact Details Stored on a Communication Device with Data Relating to the Contact Contained on Social Networking Sites". The '113 application is hereby incorporated by reference in its entirety into the present description.

The VVM client application may also be adapted to provide for a user to create/edit/delete an outgoing message (Outgoing message=a message that is played to a third party caller who is directed to the user's voicemail prior to allowing him/her to record a voicemail, often referred to as the "greeting"). The VVM client application may be adapted to allow a user to edit and listen to the new outgoing message multiple times, until the user is satisfied and indicates to the application that the outgoing message is "ready" or "confirmed", at which time the VVM client application may send the new outgoing message to the VVM server-side component(s), immediately or during the next synchronization. The VVM client application may be further adapted to store multiple outgoing messages on the remote device, which outgoing messages may be sent to the voicemail server upon request from the user. For example, the user may store a temporary "I am out of the country" outgoing message on the remote device and instruct the VVM client application, each time he/she goes out of the country, to send the stored "I am out of the country" outgoing message to the voicemail server.

The VVM client application may also include an option for a user to disable/enable the application. For example, when roaming or when interested in conserving battery power. According to further embodiments of the present invention, the VVM client application may include an option to automatically disable itself when the remote device is "roaming".

According to some embodiments of the present invention, the VVM client application may be preloaded (ROM, UDA or MMC) on a remote device when a user acquires it. The VVM client application may be preloaded by the cellular network operator as an application or preloaded by the remote device manufacturer as part of the remote device delivered to the operator.

According to further embodiments of the present invention, the VVM client application may be installed on an existing remote device, "Over The Air" (OTA), i.e. via remote communication or by any other media, such as via a usb cable. When being installed OTA the user may receive a link via SMS to download the VVM client application, may be directed to install the application through the operator web/WAP portal, or by any other suitable means. The VVM client application may be pre-programmed with instructions on how to install itself on a remote device including another or a previous version of a VVM client application.

The VVM client application can be preconfigured to work with a specific voicemail server before being installed on a remote device. Alternatively, operational parameters related to a specific voicemail server, such as server IP, username or password, may be acquired by the VVM client application from a VVM server-side component or a third party. The identity of, and parameters for communication with, the VVM server-side component or third party may be pre-programmed into the VVM client application and/or may be sent to the application by a server-side component via SMS or any other management protocol. This may also be done via standard management mechanisms such as OMA DM server that may be operated by the cellular operator, the VVM client application provider, a device vendor or any other entity. The VVM client application may acquire said parameters: (1)

upon the first instancement of the application, (2) periodically, (3) when prompted by the user, (4) when receiving a notification that a parameter has been updated and/or (5) when the VVM application recognizes that a parameter update may be necessary (for example, as part of a troubleshooting process when a connection is unavailable).

According to some embodiments of the present invention, the VVM client application may include a VVM server-side component interface module adapted to interface with VVM server-side components over a data link. The interface module may use interface parameters stored on a configuration file in order to determine a protocol for establishing and maintaining communication with VVM server-side components. Since different voicemail servers provide different APIs using different protocols for interfacing with their voicemail systems, different protocols may be required when communicating with different voicemail systems and/or their respective VVM server-side components. According to further embodiments of the present invention the VVM may also support various types of VVM server-side components in parallel.

The configuration data associated with a VVM client application on a given remote device may be remotely swapped or edited using a configuration sms or any other management protocol. This may also be done via standard management mechanisms such as OMA DM server that may be operated by the cellular operator, the VVM client application provider, a device vendor or any other entity. A cellular operator providing voicemail server functionality in accordance with embodiments of the present invention or a VVM server-side component associated with it, may send a customized configuration sms to the remote device, which customized configuration sms may provide the VVM client application with configuration data corresponding to the operator's voicemail server protocols. According to further embodiments of the present invention, the VVM client application may initiate an update of the VVM client application version, periodically and/or upon receiving a notification from a server-side component that an update is available.

According to some embodiments of the present invention, a VVM client application user interface may include part or all of the following exemplary functionalities:

| | |
|---|---|
| General | New message popup - opens VVM |
| | Caller ID correlation with local contacts |
| | Support all message media types |
| | Open VVM from application menu |
| | Browse and listen in any order |
| | Speech to text conversion |
| Message function | Call back |
| | Reply via SMS |
| | Forward via MMS |
| | Forward via Email |
| | Add/update caller ID in local contacts |
| | Archive (store in archive - on device or on server) |
| | Delete (from server and/or client) |
| | Sort messages by selected parameter (date, caller, etc.) |
| | Deposit new message directly in mailbox |
| Icon indication | Read/unread |
| | Replied |
| | Forwarded |
| | Called back |
| Player function | Play/pause |
| | Fast forward/rewind |
| | Play to loud speakers/private speaker |
| | Volume control |
| Greeting management | Record new greeting |
| | Support different greeting types (full, VS, temporary . . . ) |
| | Activate/deactivate greeting |
| | Delete greeting |
| New user tutorial | Free test and images |
| | triggered actions (examples - greeting recording, TUI PIN setup, roaming behavior) |
| | Integrated help |

According to some embodiments of the present invention, a VVM network support may include part or all of the following exemplary characteristics/capabilities/variants:

| | |
|---|---|
| IMAP variants | General IMAP |
| | Comverse |
| | Unisys |
| | Ericsson |
| | Alcatel Lucent |
| | OMTP |
| HTTP variant | Acision |
| | Proprietary in house |
| Security | Secured Sockets Layer (SSL) |
| | StartTLS |
| | MD5- Digest authentication |
| Message type support | Voice (AMR, WAV, MP3 . . . ) |
| | Video (3GPP, MP4, . . . ) |
| | Fax (GIF, BMP, JPEG, etc.) |

An Example of Service Flow and UI—

Figure 3:
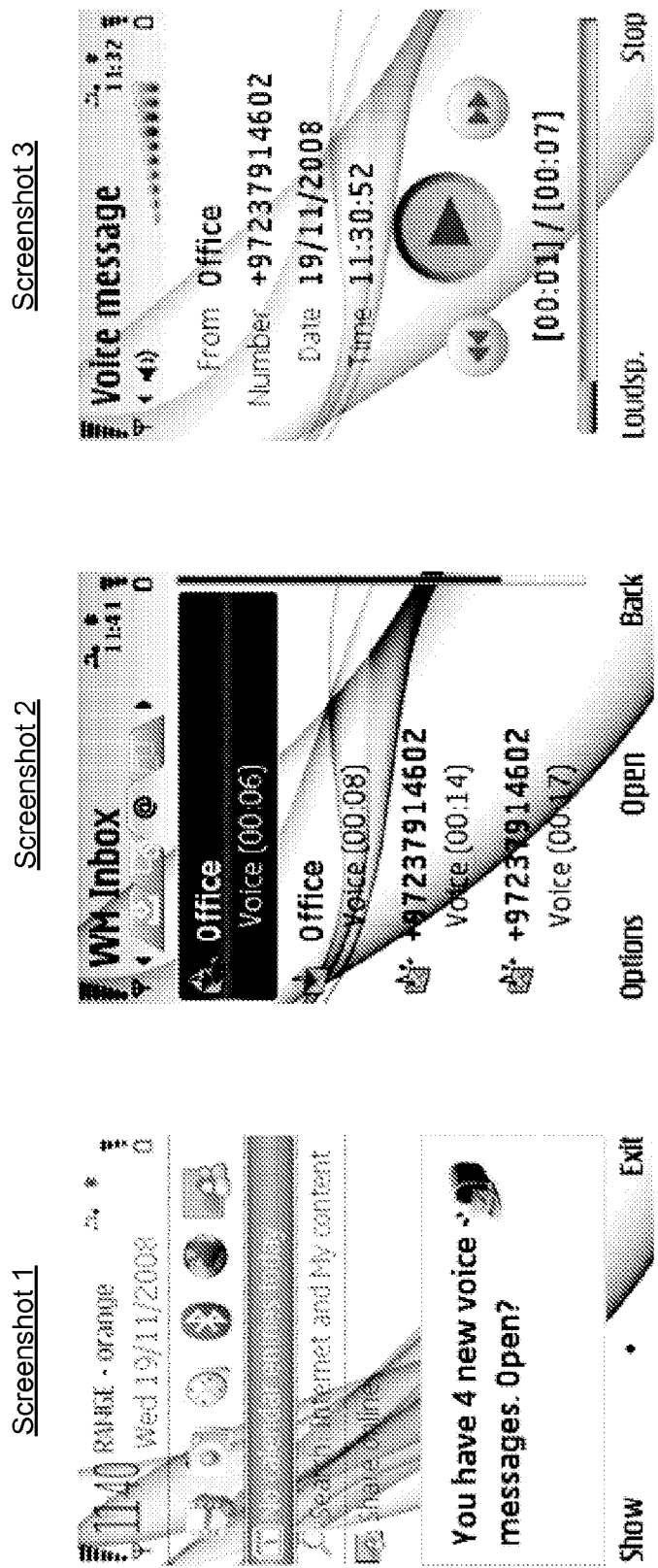
FIGS. 3 & 4: are exemplary screenshots (1-6) of a VVM client application running in a Symbian environment, according to some embodiments of the present invention.
Figure 4:
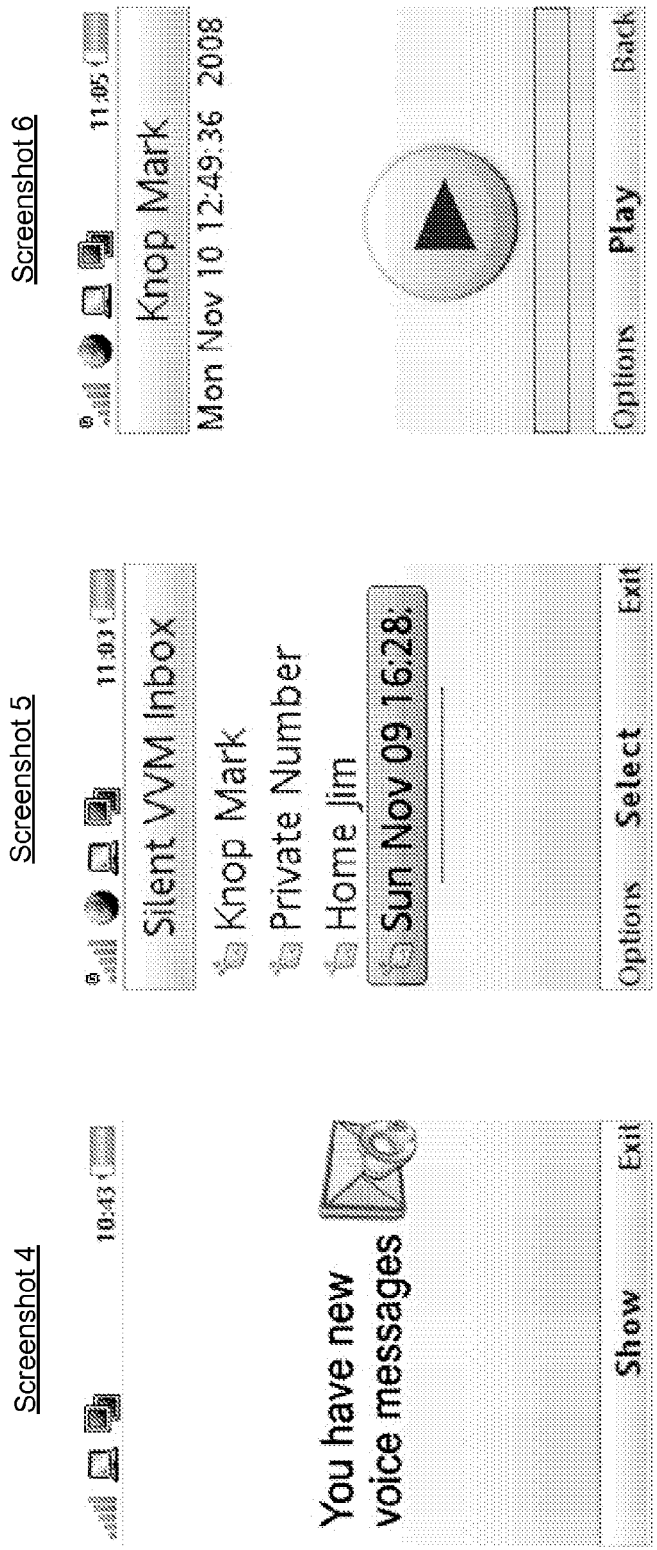
Figure 5:
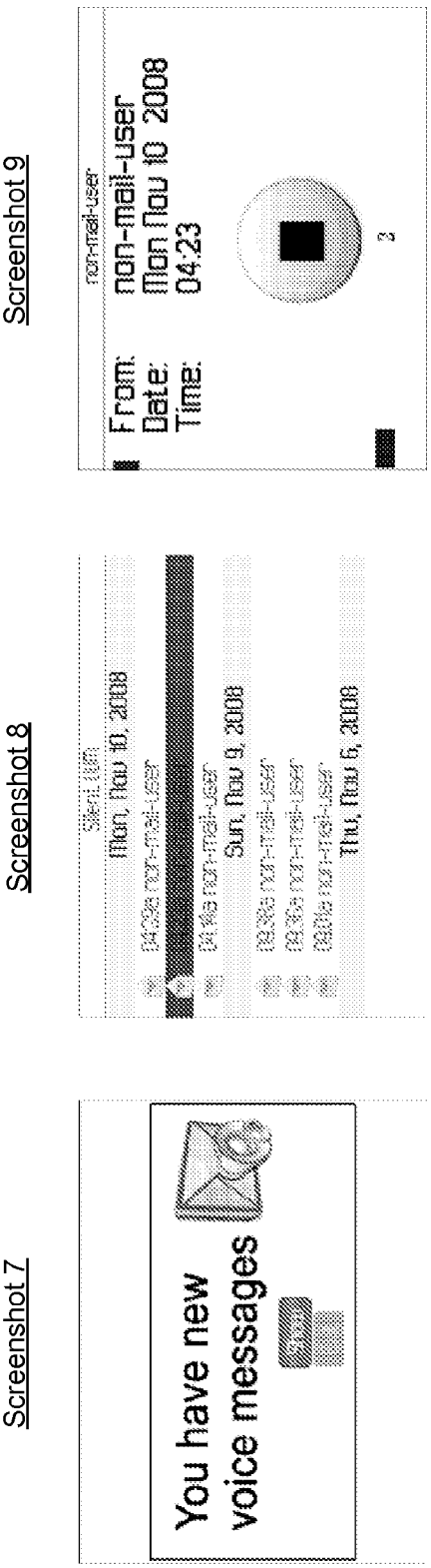
FIG. 5: are exemplary screenshots (7-9) of a VVM client application running in a Blackberry environment, according to some embodiments of the present invention.
Figure 6:
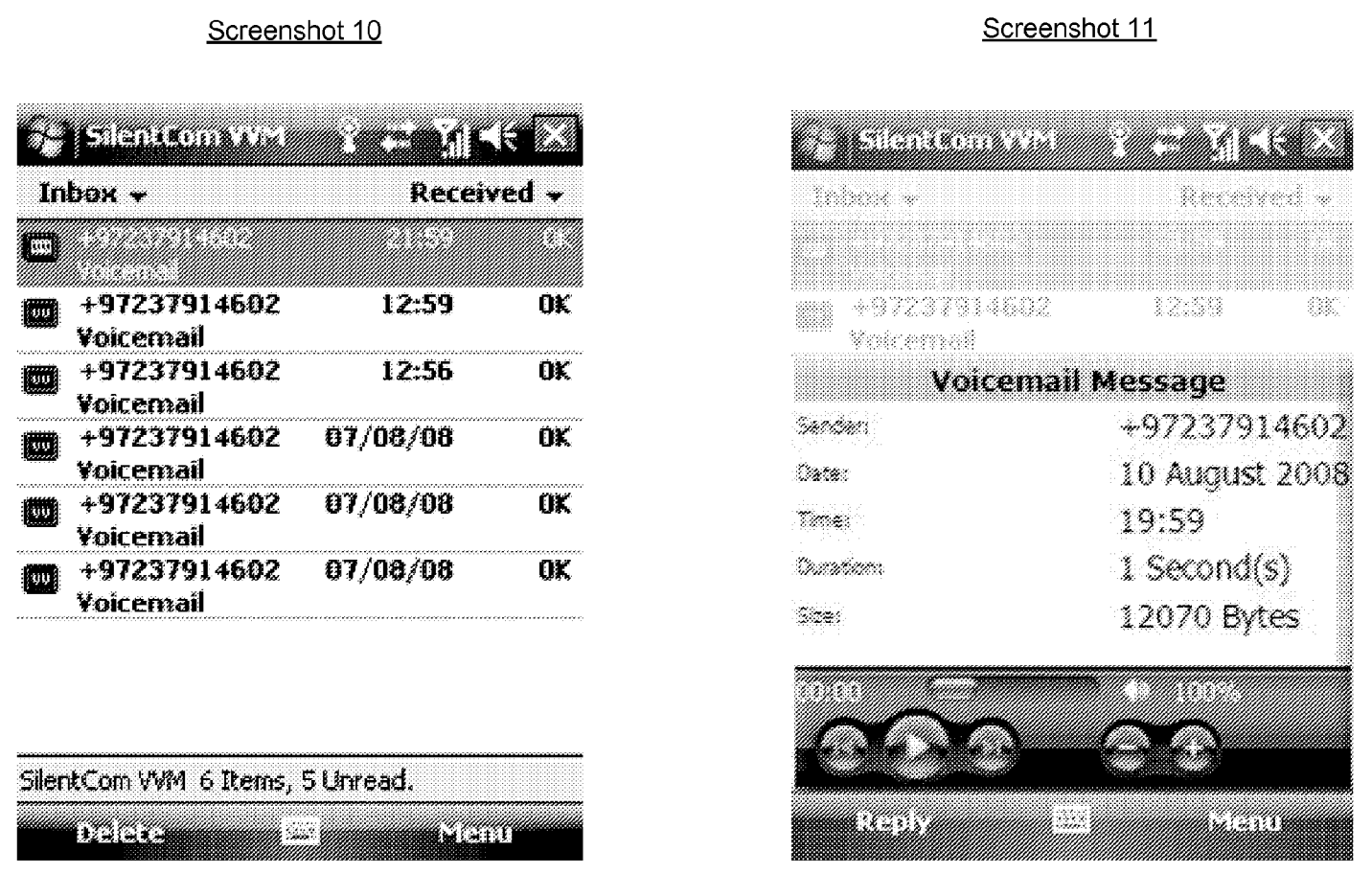
Figure 7:
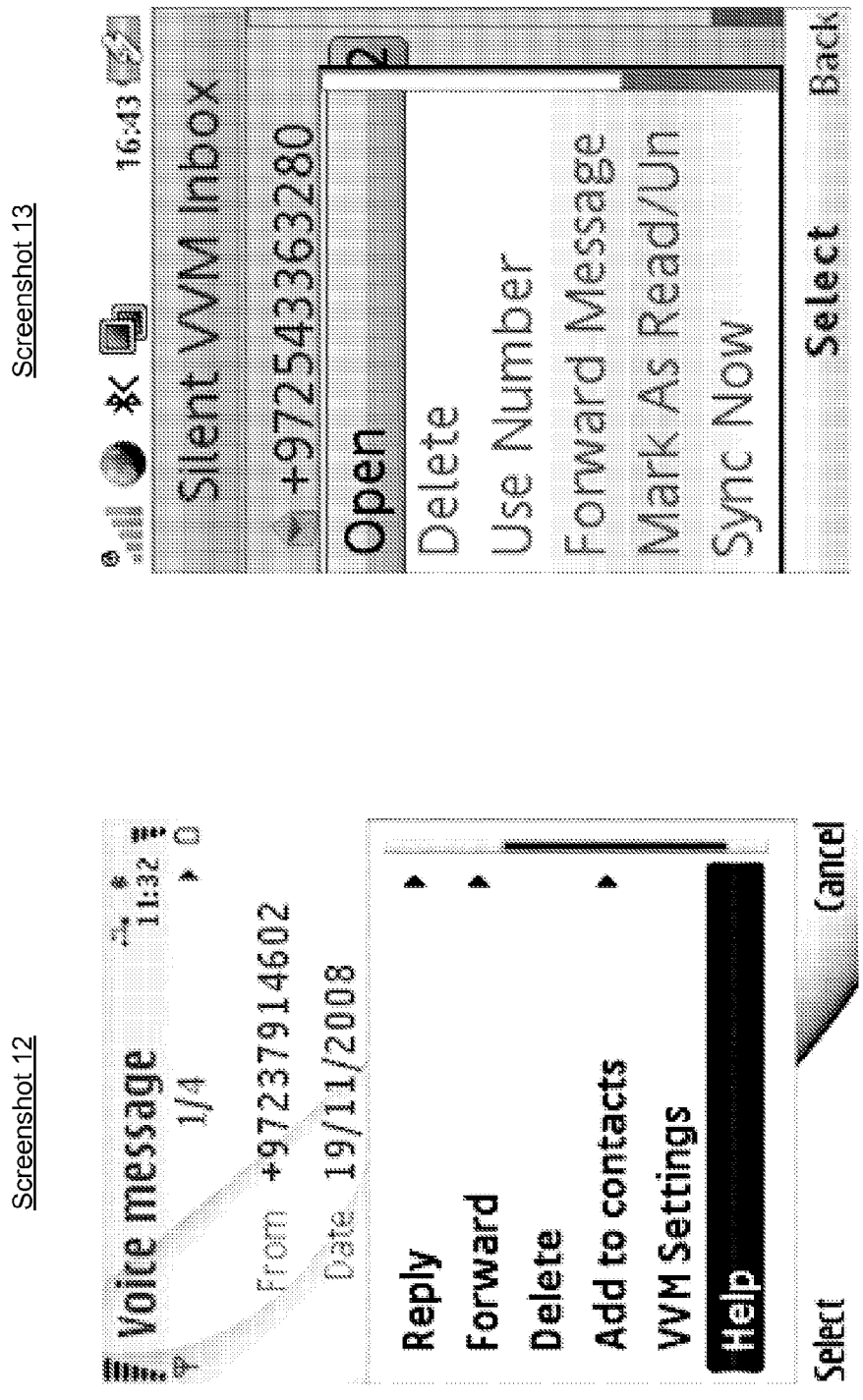
FIG. 7: are exemplary screenshots (12-13) of a "VVM SETTINGS" screen within a VVM client application, according to some embodiments of the present invention.
Figure 9:
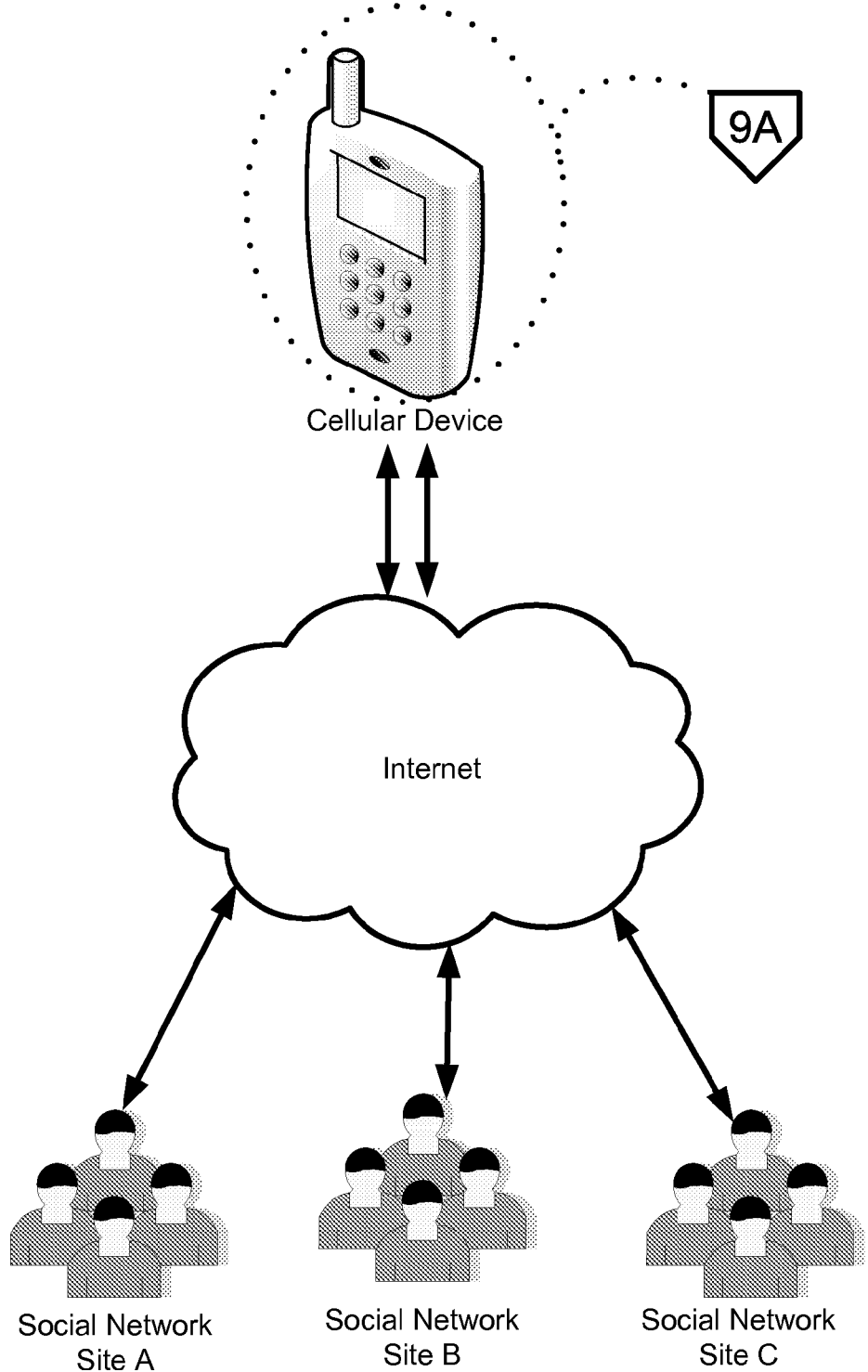
FIGS. 9 & 9A: are block diagrams of an exemplary system, method, circuit and associated software for augmenting contact details stored on a communication device, such as a mobile phone, with data relating to the contact contained on social networking sites, in accordance with some embodiments of the present invention.
Figure 9A:
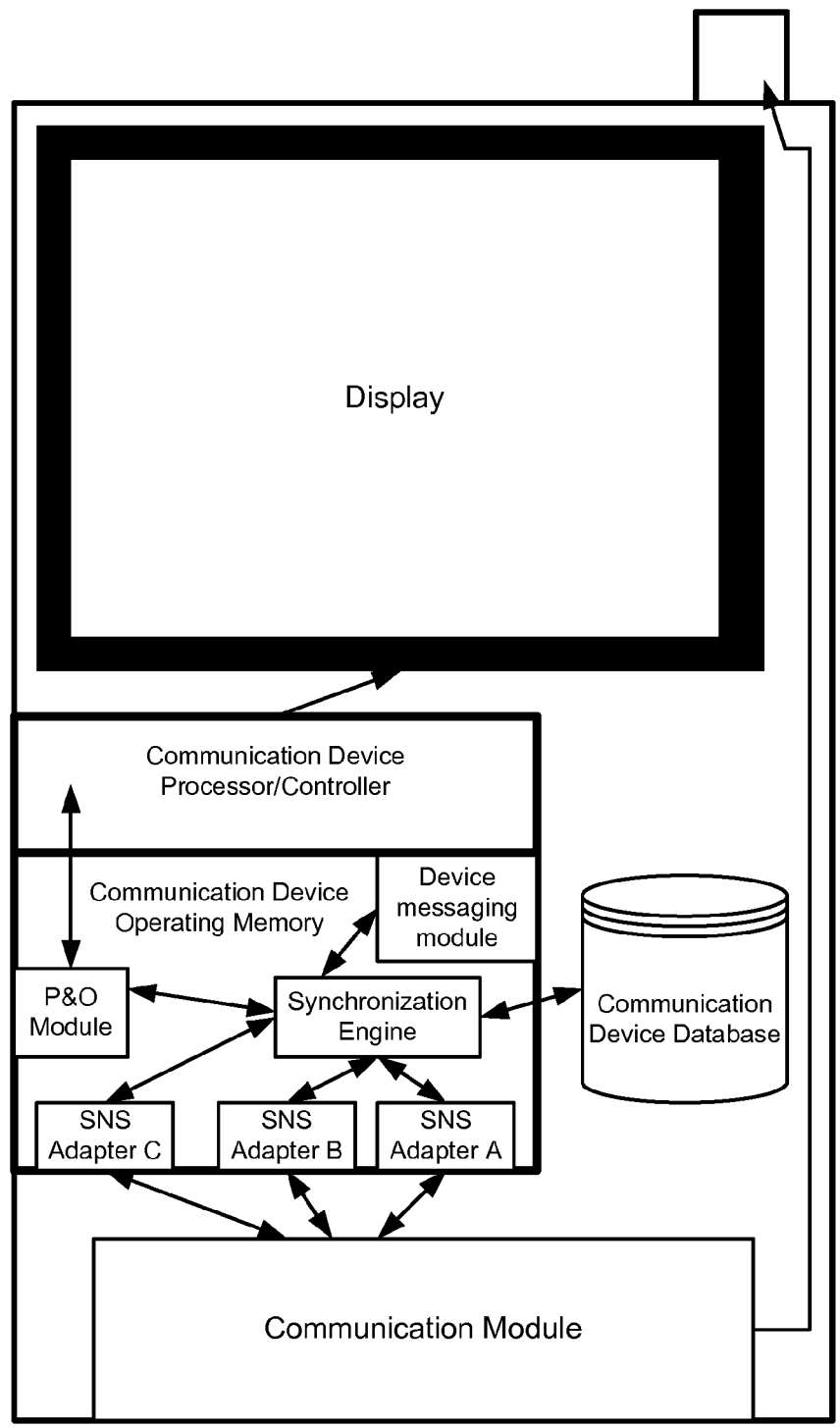
Figure 10:
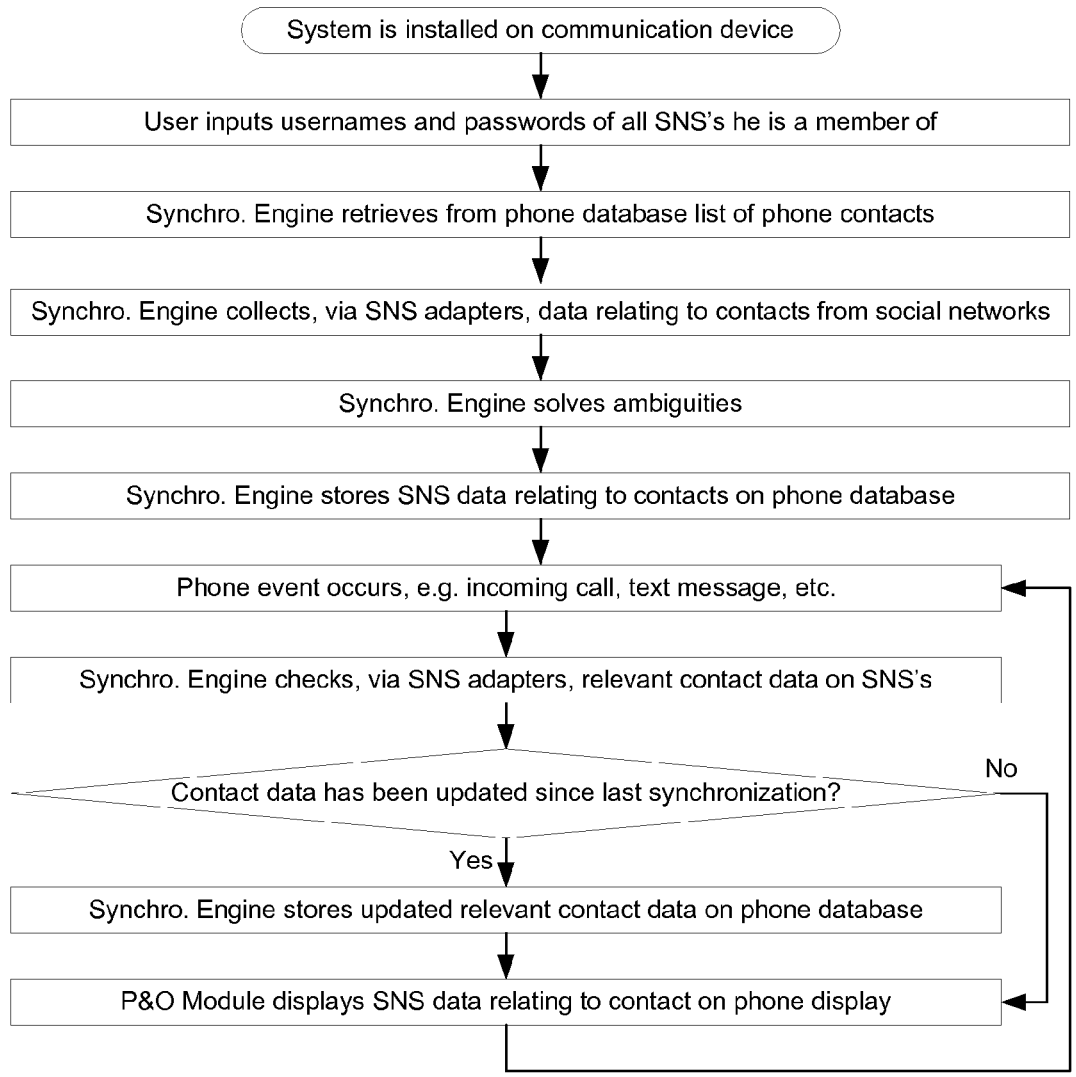
FIG. 10: is a flowchart containing exemplary steps of operation of a system, method, circuit and associated software for augmenting contact details stored on a communication device, such as a mobile phone, with data relating to the contact contained on social networking sites, in accordance with some embodiments of the present invention.

The following are some illustrative examples of operations of a VVM system when integrated into specific cellular operating systems, according to some specific embodiments of the present invention. These examples are presented to further elucidate certain aspects of the present invention and as such should not be considered to encompass the full scope of the present invention. The following examples may be best understood with reference to FIGS. 3-8 (screenshots 1-15), in which FIGS. 3-4 (screenshots 1-6) illustrate exemplary Symbian screen shots, FIG. 5 (screenshots 7-9) illustrate exemplary Blackberry screen shots, FIG. 6 (screenshots 10-11) illustrate exemplary Windows Mobile screen shots, FIG. 7 (screenshots 12-13) illustrate exemplary Message Handling screen shots and FIG. 7 (screenshots 14-15) illustrate exemplary Greeting Provisioning screen shots.

When a new message is deposited in the user's voice mailbox a "silent SMS" (SMS Zero) notification alerts the VVM client application of a status change. The VVM client application may, as a result, retrieve the message from the server with no user interaction (Synchronization). Once the message has been downloaded to the remote device the user may be notified by the visual voicemail client application that he/she has a new voice message (examples shown in screenshots 1, 4 & 7). Pressing the "SHOW" key (bottom left) may lead to an "INBOX" view (examples shown in screenshots 2, 5, 8 & 10) of all new and previous messages. Each message may bare the following information—an icon identifying message status (new or listened), CLI or name as retrieved from phone address book, time of message leaving and message length. Selecting one of the messages may lead to a "PLAY" screen (examples shown in screenshots 3, 6, 9 & 11), where message details may appear again. Pressing left or right key may move to next or previous messages respectively. Pressing "SELECT" key again may start the play of the message with the ability to move forward and backward using the left and right key respectively. The message may be played in the earphone mode; and the user may press the right key to activate in speaker mode.

Variants to the Flow

There are some variance to the above flow that are based on different platforms.

Message download—in Java platform demo environment the user needs to authorize the download as part of the usage sequence. Once the application is signed by the operator (normal procedure before launch) this action is eliminated.

Playing mode: in Symbian the message is heard in earphone mode with the option for loudspeakers. In Java platform only Nokia S40 supports this procedure. The rest of Java platform routs the voice message to the phone's loudspeakers.

Message Handling

Once having selected a specific voice message within the "INBOX, pressing the "OPTIONS" key may lead the user to the "MESSAGE HANDLING" screen (examples shown in screenshots 12-13). Selecting "ADD TO CONTACTS" may allow the user to save the details of the message origination in his/her local contacts. Selecting "REPLY" may allow a user to reply to the originator of a voicemail via sms or mms. Selecting "FORWARD" may allow a user to forward the voice message to another user via voicemail, sms, email, etc. Selecting "DELETE" may delete the message from the local storage and the server storage. Selecting "VVM SETTINGS" may lead the user to a "SETTINGS" screen where he/she may be able to modify the system settings.

Greeting Provisioning

Within the "SETTINGS" screen selecting "OUT-GONG MESSAGE" or "GREETING" may lead the user to a "GREETING" screen (examples shown in screenshots 14-15). Within the "GREETING" screen the user may be able to listen/record/delete new greetings and select an active greeting to be used currently. Once the user has confirmed his current greeting choice, the VVM client application may synchronize with the voicemail server and replace the old greeting with the new one, so when a new caller is directed to the user's voicemail, he/she will be welcomed by the new message. Multiple greetings handling can also be provided in various situations requiring different notifications to be applied to the voicemail.

An additional option available in the setting menu is to disable/enable the VVM client application. This option is for users who wish to disable the VVM system temporarily, like in a roaming situation.

The present invention can be practiced by employing conventional tools, methodology and components. Accordingly, the details of any such tool, component and methodology are not set forth herein in detail. In the previous descriptions, numerous specific details are set forth, in order to provide a thorough understanding of the present invention. However, it should be recognized that the present invention may be practiced without resorting to the details specifically set forth.

It should also be understood by one of skill in the art that some of the functions described as being performed by a specific component of the system may be performed by a different component of the system in other embodiments of this invention.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A mobile phone comprising:
a local memory adapted to store contacts, wherein a contact includes a phone number and an identity indicator associated with the phone number;
a synchronization engine adapted to:
(a) correlate a first profile contained on a first social networking site with a first contact stored in said local memory;
(b) retrieve from the first social networking site data contained in the first profile; and
(c) associate the retrieved data with the first contact;
and
a presentation and operation module adapted to cause the control circuitry of said mobile phone to display, in association with the first contact, the retrieved data, upon a graphic user interface of said mobile phone.

2. The mobile phone according to claim 1, wherein said synchronization engine is further adapted to update the retrieved data, from the first social networking site, substantially continuously.

3. The mobile phone according to claim 1, wherein said synchronization engine is further adapted to update the retrieved data, from the first social networking site, periodically.

4. The mobile phone according to claim 1, wherein said synchronization engine is further adapted to update the retrieved data, from the first social networking site, upon the occurrence of an event on said mobile phone relating to the first contact.

5. The mobile phone according to claim 1, further comprising a social networking site adapter adapted to communicate with an application programming interface provided by the first social networking site.

6. The mobile phone according to claim 1, wherein said synchronization engine is further adapted to correlate the first profile with the first contact in a case that there are differences between a name associated with the first profile and an identity indicator associated with the first contact.

7. The mobile phone according to claim 1, wherein:
said synchronization engine is further adapted to:
a. correlate a second profile contained on a second social networking site with the first contact;
b. retrieve from the second social networking site data contained in the second profile;
c. aggregate and synchronize the data retrieved from the first and second profiles;
and
said presentation and operation module is further adapted to cause the control circuitry of said mobile phone to display, in association with the first contact, the aggregated data, upon a graphic user interface of said mobile phone.

8. The mobile phone according to claim 1, wherein said correlation is at least partially based on an email associated with the first contact.

9. The mobile phone according to claim 1, wherein said correlation is at least partially based on a phone number associated with the first contact.

10. The mobile phone according to claim 1, wherein said synchronization engine is adapted to independently detect that a user of the mobile phone is a member of the first social networking site.

11. A method for augmenting contact details stored on a mobile phone, said method comprising:

correlating a first profile contained on a first social networking site with a first contact stored in a local memory of the mobile phone, wherein a contact includes a phone number and an identity indicator associated with the phone number;

retrieving from the first social networking site data contained in the first profile;

associating the retrieved data with the first contact; and displaying, in association with the first contact, the retrieved data, upon a graphic user interface of the mobile phone.

12. The method according to claim 11, further comprising updating the retrieved data, from the first social networking site, substantially continuously.

13. The method according to claim 11, further comprising updating the retrieved data, from the first social networking site, periodically.

14. The method according to claim 11, further comprising updating the retrieved data, from the first social networking site, upon the occurrence of an event on the mobile phone relating to the first contact.

15. The method according to claim 11, further comprising communicating with an application programming interface provided by the first social networking site using a social networking site adapter.

16. The method according to claim 11, further comprising correlating the first profile with the first contact in a case that there are differences between a name associated with the first profile and an identity indicator associated with the first contact.

17. The method according to claim 11, further comprising:

a. correlating a second profile contained on a second social networking site with the first contact;

b. retrieving from the second social networking site data contained in the second profile;

c. aggregating and synchronizing the data retrieved from the first and second profiles; and d. displaying, in association with the first contact, the aggregated data, upon a graphic user interface of said mobile phone.

18. The method according to claim 11, wherein said correlation is at least partially based on an email associated with the first contact.

19. The method according to claim 11, wherein said correlation is at least partially based on a phone number associated with the first contact.

20. The method according to claim 11, further comprising. independently detecting, by processing circuitry of the mobile phone, that a user of the mobile phone is a member of the first social networking site.

\* \* \* \* \*